(12) United States Patent  (10) Patent No.: US 8,156,180 B2
Adelman  (45) Date of Patent: Apr. 10, 2012

(54) TOOLS FOR REDIRECTING TO A BOOK WEBSITE

(75) Inventor: Warren Adelman, Scottsdale, AZ (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 189 days.

(21) Appl. No.: 12/625,919

(22) Filed: Nov. 25, 2009

(65) Prior Publication Data

US 2011/0125831 A1    May 26, 2011

(51) Int. Cl.
*G06F 15/16* (2006.01)
(52) U.S. Cl. ........... 709/203; 709/206; 709/243; 705/28
(58) Field of Classification Search .................. 709/203, 709/206, 223
See application file for complete search history.

(56) References Cited

U.S. PATENT DOCUMENTS

| | | | |
|---|---|---|---|
| 6,085,229 A | 7/2000 | Newman et al. | |
| 6,256,633 B1 | 7/2001 | Dharap | |
| 6,298,341 B1 | 10/2001 | Mann et al. | |
| 6,332,158 B1 | 12/2001 | Risley et al. | |
| 6,401,094 B1 | 6/2002 | Stemp et al. | |
| 6,519,589 B2 | 2/2003 | Mann et al. | |
| 6,560,634 B1 | 5/2003 | Broadhurst | |
| 6,615,247 B1 | 9/2003 | Murphy | |
| 6,745,248 B1 | 6/2004 | Gardos et al. | |
| 6,880,007 B1 | 4/2005 | Gardos et al. | |
| 7,111,229 B2 | 9/2006 | Nicholas et al. | |
| 7,805,379 B1 * | 9/2010 | Adkins et al. | 705/307 |
| 2001/0029483 A1 | 10/2001 | Schultz et al. | |
| 2002/0035611 A1 * | 3/2002 | Dooley | 709/218 |
| 2002/0065903 A1 | 5/2002 | Fellman | |
| 2002/0194373 A1 * | 12/2002 | Choudhry | 709/242 |
| 2004/0199520 A1 | 10/2004 | Ruiz et al. | |
| 2004/0220903 A1 | 11/2004 | Shah et al. | |
| 2004/0249978 A1 | 12/2004 | Marappan et al. | |
| 2005/0102354 A1 | 5/2005 | Hollenbeck et al. | |
| 2005/0198095 A1 | 9/2005 | Du et al. | |
| 2005/0256853 A1 | 11/2005 | Fellman | |
| 2006/0011720 A1 * | 1/2006 | Call | 235/383 |
| 2006/0155656 A1 | 7/2006 | Kreder, III et al. | |
| 2006/0157560 A1 | 7/2006 | Skor et al. | |
| 2006/0161682 A1 | 7/2006 | King et al. | |
| 2006/0167864 A1 | 7/2006 | Bailey et al. | |
| 2006/0184620 A1 | 8/2006 | Melet et al. | |
| 2008/0059607 A1 * | 3/2008 | Schneider | 709/218 |
| 2008/0120617 A1 * | 5/2008 | Keller et al. | 718/101 |
| 2008/0126232 A1 * | 5/2008 | Lee | 705/35 |
| 2009/0048712 A1 * | 2/2009 | Rosenblum | 700/242 |
| 2009/0132487 A1 * | 5/2009 | Lev | 707/3 |
| 2009/0222368 A1 | 9/2009 | McCauley et al. | |
| 2009/0272799 A1 * | 11/2009 | Skor et al. | 235/381 |

(Continued)

OTHER PUBLICATIONS

May 10, 2011 Non-Final Rejection, U.S. Appl. No. 12/625,892 (Publication US 2011-0125830 A1).

(Continued)

*Primary Examiner* — Wing Chan
*Assistant Examiner* — Tesfay Yohannes
(74) *Attorney, Agent, or Firm* — Chris A. Watt (57) ABSTRACT

Systems and methods of the present invention provide for redirecting a user to a book's website after submitting a request for information about the book. The book's website or a link to the website may be displayed to the user on a client browser.

16 Claims, 4 Drawing Sheets

U.S. PATENT DOCUMENTS

| | | | | |
|---|---|---|---|---|
| 2009/0307256 | A1* | 12/2009 | Tiyyagura | 707/102 |
| 2009/0327231 | A1* | 12/2009 | Zappa et al. | 707/3 |
| 2010/0235447 | A1* | 9/2010 | Goodman et al. | 709/206 |
| 2010/0306122 | A1* | 12/2010 | Shaffer | 705/319 |

OTHER PUBLICATIONS

Aug. 9, 2011 Response to May 10, 2011 Non-Final Rejection, U.S. Appl. No. 12/625,892 (Publication US 2011-0125830 A1).

Aug. 2, 2011 Non-Final Rejection, U.S. Appl. No. 12/625,919 (Publication US 2011-0125831 A1).

Aug. 9, 2011 Response to Aug. 2, 2011 Non-Final Rejection, U.S. Appl. No. 12/625,919 (Publication US 2011-0125831 A1).

Oct. 17, 2011 Final Rejection, U.S. Appl. No. 12/625,892 (Publication US 2011-0125830 A1).

Nov. 17, 2011 Response to Oct. 17, 2011 Final Rejection, U.S. Appl. No. 12/625,892 (Publication US 2011-0125830 A1).

Sep. 2, 2011 Final Rejection, U.S. Appl. No. 12/625,919 (Publication US 2011-0125831 A1).

Nov. 17, 2011 Response to Sep. 2, 2011 Final Rejection, U.S. Appl. No. 12/625,919 (Publication US 2011-0125831 A1).

* cited by examiner

TOOLS FOR REDIRECTING TO A BOOK WEBSITE

CROSS REFERENCE TO RELATED PATENT APPLICATIONS

This patent application is related to the following concurrently-filed patent applications:

U.S. patent application Ser. No. 12/625,892, "REDIRECTING TO A BOOK WEBSITE."

The subject matter of all patent applications is commonly owned and assigned to The Go Daddy Group, Inc. All prior applications are incorporated herein in their entirety by reference.

FIELD OF THE INVENTION

The present inventions generally relate to the field of websites for books and specifically to the field of directing a researcher, customer or potential customer to a book's website using the book's ISBN, title, author, subject or other information about the book.

SUMMARY OF THE INVENTION

The present invention provides methods and systems for directing a customer or potential customer to a book's website. An exemplary method may comprise several steps including the step of electronically receiving a request from a user for information about a book. Electronic receipt of the request may then be used to redirect the user to a domain name and website for the book.

The above features and advantages of the present invention will be better understood from the following detailed description taken in conjunction with the accompanying drawings.

DETAILED DESCRIPTION

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as websites. The combination of all the websites and their corresponding web pages on the Internet is generally known as the World Wide Web (WWW) or simply the Web.

The Internet offers opportunities for users to research and purchase books online. A website may be created and maintained for information relating to a certain published book. This website may allow anyone interested in the book to find out information about the book, including, but not limited to a book summary, biographical information about the author, book reviews, book signings, other calendar events, blogs about the author or the book, news about related materials by the author which may be published soon, contact information for the author or publisher, etc.

Additional websites on the web may allow customers, potential customers, or users researching information about the book to learn more about the book. For example, sites such as AMAZON.COM, BARNESANDNOBLE.COM, BORDERS.COM and ISBNDB.COM may provide a customer, potential customer or researcher additional information about the book including titles, summary, publisher, plot, characters, number of pages, price information, customer reviews, similar books, related books in a series, author interviews, related websites, related subjects, websites for purchasing the book, the book's physical description, what editions are available, whether the book is in stock, pre-ordering information, book formats, customer purchasing trends, ISBN, etc.

The International Standard Book Number (ISBN) is a unique numeric commercial book identifier based upon the 9-digit Standard Book Numbering (SBN) code. The 10-digit ISBN format was developed by the International Organization for Standardization. The ISBN is 13 digits long if assigned after Jan. 1, 2007, and 10 digits long if assigned before 2007. An ISBN is assigned to each edition and variation (except reprinting) of a book. A 13 digit ISBN contains a GS1 prefix, which may indicate the industry; for example, 978 may identify book publishing. The ISBN may also contain a group identifier, a publisher code, an item number, and a checksum character or check digit. Barcodes may be found on a book's cover and they may have a separate barcode encoding five digits for the currency and the recommended retail price.

A Method for Directing a Customer to a Book Website Using the Book's ISBN

Several different methods may be used to provide and manage the disclosed invention. In an example embodiment illustrated in FIG. 1, a request for book information may be received from a user using an ISBN, title, author, subject or other information related to the book (Step 100), and any combination of software modules used together with the hardware on a server in a data center may receive and process the request and access data storage within the data center containing information about the book associated with the ISBN, or other book information including, but not limited to, a domain name and related website containing information about that book. (Step 110). The software modules may then compare the ISBN or other book information with the related book information from the data storage to forward or redirect the user to the book's website (Step 120).

Figure 2:
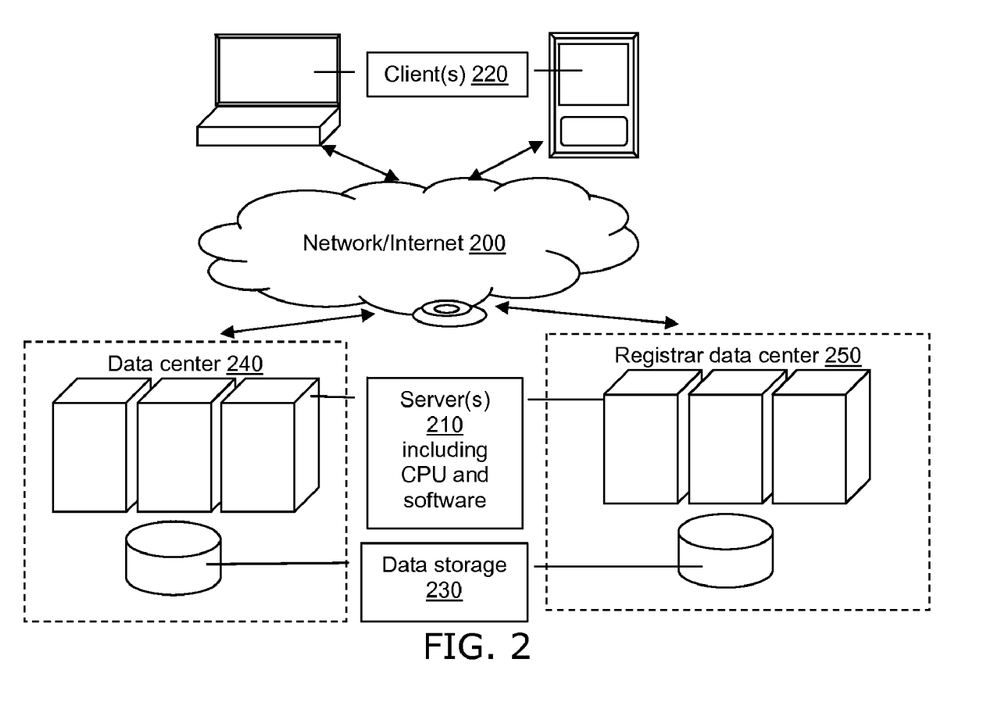
FIG. 2 illustrates a possible system for redirecting a user to a book's website.

Several different environments may be used to accomplish the steps of embodiments disclosed herein. FIG. 2 demonstrates a streamlined example of such an environment and illustrates a non-limiting example of a system and/or structure that may be used to accomplish the methods and embodiments disclosed and described herein. Such methods may be performed by any central processing unit (CPU) in any computing system, such as a microprocessor running on at least one server 210 and/or client 220, and executing instructions stored (perhaps as scripts and/or software, possibly as software modules) in computer-readable media accessible to the CPU, such as a hard disk drive on a server 210 and/or client 220.

The example embodiments shown and described herein exist within the framework of a network 200 and should not limit possible network configuration or connectivity. Such a network 200 may comprise, as non-limiting examples, any combination of the Internet, the public switched telephone network, the global Telex network, computer networks (e.g., an intranet, an extranet, a local-area network, or a wide-area network), a wired network, a wireless network, a telephone network, a corporate network backbone or any other combination of known or later developed networks.

At least one server 210 and at least one client 220 may be communicatively coupled to the network 200 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

The server(s) 210 and client(s) 220 (along with the software modules described herein) may be communicatively coupled to the network 200 and to each other in such as way as to allow a user to request information about the book, request information about domain names, register domain names, accept ISBN numbers via barcode scanners and/or accomplish any other methods disclosed herein.

Such server(s) 210 may comprise any computer or program that provides services to other computers, programs, or users either in the same computer or over a computer network 200. As non-limiting examples, the server 210 may comprise application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, a cloud hosting solution, a grid hosting solution, or any combination thereof) and may be used, for example to provide access to website content requested by a client 220.

The server 210 may exist within a server cluster, as illustrated. These clusters may include a group of tightly coupled computers that work together so that in many respects they can be viewed as though they are a single computer. The components may be connected to each other through fast local area networks which may improve performance and/or availability over that provided by a single computer.

The client 220 may be any computer or program that provides services to other computers, programs, or users either in the same computer or over a computer network 200. As non-limiting examples, the client 220 may be an application, communication, mail, database, proxy, fax, file, media, web, peer-to-peer, or standalone computer, cell phone, personal digital assistant (PDA), etc. which may contain an operating system, a full file system, a plurality of other necessary utilities or applications or any combination thereof on the client 220. Non limiting example programming environments for client applications may include JavaScript/AJAX (client side automation), ASP, JSP, Ruby on Rails, Python's Django, PHP, HTML pages or rich media like Flash, Flex or Silverlight.

The client 220 that may be used to connect to the network 200 to use the illustrated embodiments may include, but are not limited to, a desktop computer, a laptop computer, a hand held computer, a terminal, a television, a television set top box, a cellular phone, a wireless phone, a wireless hand held device, an Internet access device, a rich client, thin client, or any other client functional with a client/server computing architecture. Client software may be used for authenticated remote access to a hosting computer or server. These may be, but are not limited to being accessed by a remote desktop program and/or a web browser, as are known in the art.

The client 220 may also include any machine capable of receiving an ISBN, or any other request related to the book from the user. Non-limiting examples of such machines may include a client terminal at a library, where a user may be researching information about a book, a client computer used to research information about available domain names relating to the ISBN or book generally, a scanning machine at a book reseller or library used to check the price or other information (possibly via a bar code or other scan able data) about the book via the ISBN, a client terminal at a bookstore used to look up price and other information about the book (possibly communicatively coupled to a scanning machine), etc. The ISBN or any other book information, in short, may be accepted using any machine or scanner capable of receiving the ISBN or other book information and forwarding the related information to the client 220, server 210 and/or data storage 230 in the data center 240.

The user interface displayed on the client 220 or the server 210 may be any graphical, textual, scanned and/or auditory information a computer program presents to the user, and the control sequences such as keystrokes, movements of the computer mouse, selections with a touch screen, scanned information etc. used to control the program. Examples of such interfaces include any known or later developed combination of Graphical User Interfaces (GUI) or Web-based user interfaces as seen in and after FIG. 4, Touch interfaces, Conversational Interface Agents, Live User Interfaces (LUI), Command line interfaces, Noncommand user interfaces, Object-oriented User Interfaces (OOUI) or Voice user interfaces. The ISBN or any other information, may be accepted using any field, widget and/or control used in such interfaces, including but not limited to a text-box, text field, button, hyper-link, list, drop-down list, check-box, radio button, data grid, icon, graphical image, embedded link, etc.

The server 210 may be communicatively coupled to data storage 230 of book information, domain registration information, or any other information requested. The data storage 230 may be any computer components, devices, and/or recording media that may retain digital data used for computing for some interval of time. The storage may be capable of retaining stored content for the books, domain names, websites or any other data requested, on a single machine or in a cluster of computers over the network 300, in separate memory areas of the same machine such as different hard drives, or in separate partitions within the same hard drive, such as a database partition.

Non-limiting examples of the data storage 230 may include, but is not limited to, a Network Area Storage, ("NAS"), which may be a self-contained file level network data storage connected to and supplying a computer network with file-based data storage services. The storage subsystem may also be a Storage Area Network ("SAN"—an architecture to attach remote computer storage devices to servers in such a way that the devices appear as locally attached), an NAS-SAN hybrid, any other means of central/shared storage now known or later developed or any combination thereof.

The server(s) 210 or software modules within the server(s) 210 may use query languages such as MSSQL or MySQL to retrieve the content from the data storage 230. Server-side scripting languages such as ASP, PHP, CGI/Perl, proprietary scripting software/modules/components etc. may be used to process the retrieved data. The retrieved data may be analyzed in order to determine the actions to be taken by the scripting language, such as determining whether a website exists for the book, whether a domain name is available for variations on the book title, whether domain names are available for variations on the ISBN etc.

In the context of the current invention, the client 220 may request information about the book and this request may be routed to the server(s) 210. The server may also contain one or more software modules used to process the request, access the data storage and forward or redirect the request for information about the ISBN, title, author, subject of the book to the book's website, based on information gleaned from the request and database of book information.

This redirection may be accomplished by server-side or client-side redirection, possibly using URL redirection services (an information management system, which provides an internet link that redirects users to the desired content), a manual redirect, HTTP refresh header, a refresh meta tag (which instructs the web browser to automatically refresh the current web page after a given time interval), using an HTML meta element, change to a status code or customized HTTP headers added to a script (using such languages as ASP, PHP or JavaScript), frame redirects, redirect loops, any other means of redirection now known or later developed in the art, or any combination thereof.

Redirection may induce the browser to go to another location. This may include the URL of the redirect target to be given in the "Location: header" of the HTTP response. The location header may contain a different URL or URI. For example, in ASP, a user may use a response.redirect command or in PHP, a header ("Location: http://www.example.com"); command may be used. The HTTP header redirects may also include a direct link to the destination.

Figure 3:
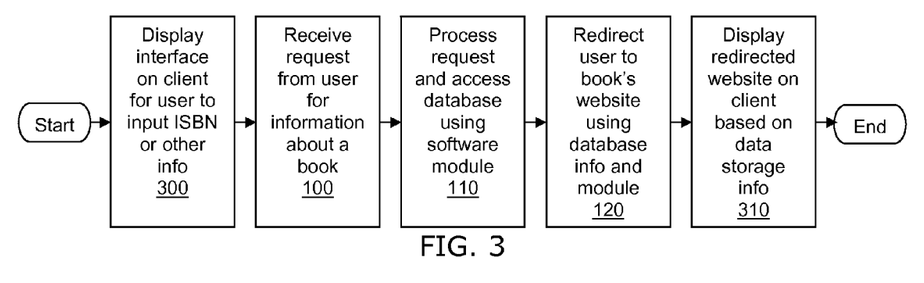
FIG. 3 is a flow diagram illustrating a possible embodiment including displaying an interface on a client for a user to input an ISBN or other book information and displaying the website on a client.

FIG. 3 shows that the illustrated embodiment, as well as other disclosed embodiments, may include the step of displaying an interface on a client 220 for the user to input the ISBN or other book information, such as title, author or subject, to request more information about the book (Step 300). In one embodiment, this information may be input via scanning an ISBN for a book into a scanning machine. This book information may be analyzed and compared to the information contained in the data storage 230, and if a significant match is found, may be used to forward or redirect the user to the book's website. This website, including information about the book, may then be displayed on the client 220 to the user (Step 310). In other embodiments, this information may be displayed on a price check machine or a receipt after the purchase of the book.

Figure 4:
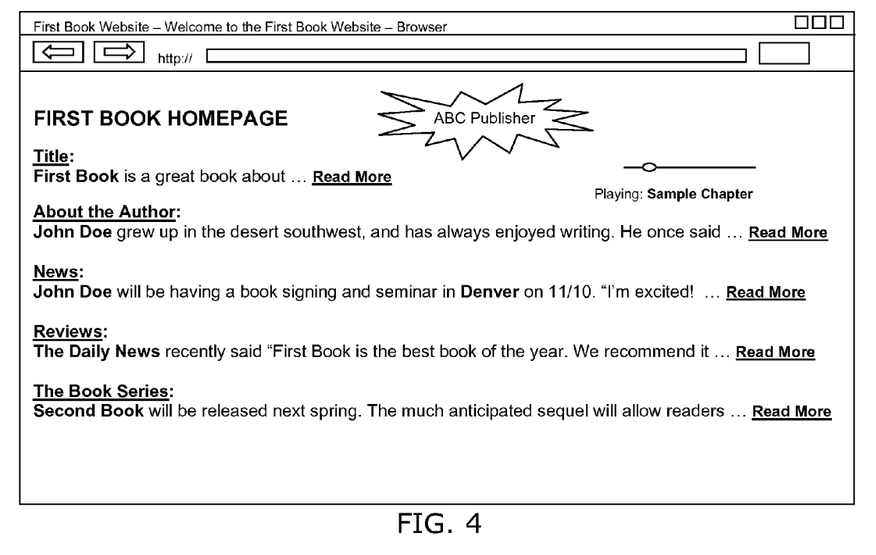
FIG. 4 illustrates a possible embodiment of an interface for displaying the website on a client.

FIG. 4 shows an example interface using the disclosed structure that may be used for displaying an interface on a client 220 for the user to input the ISBN or other book information, such as title, author, subject, etc. (Step 300, not shown in FIG. 4), which may be used to forward or redirect, and then display the book's website to the user (Step 310). In this example, the website is for a fictitious book, "First Book." This webpage, and/or the interface for entering the requested information for the book (not shown) may be displayed as a website on a client browser using the structure disclosed herein, and may be used in disclosed embodiments to demonstrate a web page that may be displayed to the user after the book information has been requested and received from the user.

For example, a user may buy a book, find the ISBN on the inside or back cover, then look up the book's website by entering the ISBN (or other information including title, author, subject, etc.) into an interface displayed on a client 220 (Step 300). In another embodiment, a user may also have found the ISBN, for example, on a book reseller's website, on a marquee in a reseller's bookstore, from a library search for related topics, etc. The user may then have searched the ISBN, title, author, subject etc. relating to the book using the disclosed interface (Step 300), entered the relevant information into the interface, and been redirected to the website to see if they want to buy the book (Step 310).

Figure 5:
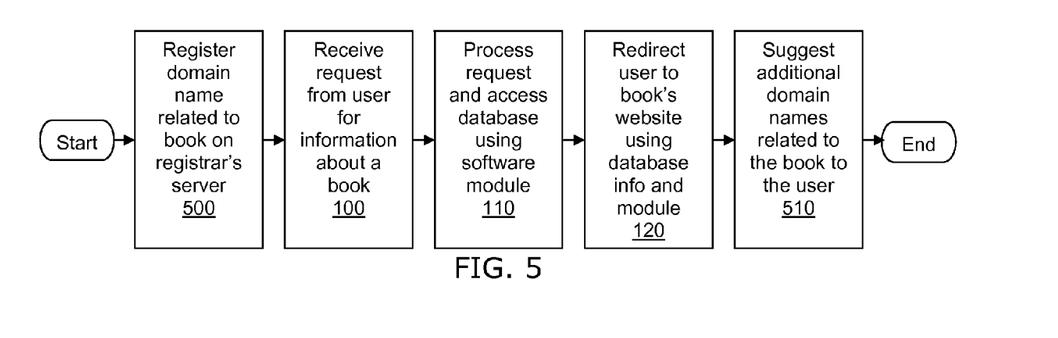
FIG. 5 is a flow diagram illustrating a possible embodiment including registering a domain name related to the book and suggesting additional domain names based on the book information.

FIG. 5 shows that the illustrated embodiment, as well as other disclosed embodiments, may include the step of registering a domain name related to the ISBN, title, author, subject or other book information utilizing a registrar's server 210, data storage 230 and/or any related hardware or software in a registrar's data center 250 (Step 500).

The environment seen in FIG. 2 may be used to access information about one or more available domain names using data and processes on or communicatively coupled to a registrar's server 210 and data storage 230 in a registrar's data center 250. The servers 210, data storage 230 and/or any software modules contained in the data center 240 or registrar's data center 250 may be linked and/or synchronized so that, as a non-limiting example, the data, software and/or hardware for the book's website in the data center 240 may allow the data, software and/or hardware in the registrar's data center 250 to determine if domain names are available for variations on information related to the book, including the book's ISBN, title, author, subject, etc., and the steps, data and processes needed to redirect any new domain names to the original domain name and/or website for the book.

If such book-related domain names are available, the data, software and/or hardware in the registrar's data center 250 may be used to inform the user of the available domain names, redirect any relevant domain names to the original book website and forward the relevant book information from the data storage 230 to be displayed to the user, which may include any registrant, potential registrant, customer, potential customer or researcher. The book information and domain name information may be freely transferred between the data, hardware and/or software of either the data center 240 or the registrar's data center 250.

The software modules used in the context of the current invention may be stored in the memory of—and run on—at least one server 210. As a non-limiting example of such software modules, a domain name registration module may be used to register domain names. If the domain name is available, the domain name registration module may register the domain name to the user as a registrant. The software modules may comprise software and/or scripts containing instructions that, when executed by a microprocessor on a server 210 or client 220, cause the microprocessor to accomplish the purpose of the module, in this example to register a domain name to a registrant, if available.

This domain name registration module may comprise any domain name registration system known in the art or developed in the future including, but not limited to, a website-enabled domain name purchase and registration system, such as that described in detail above and/or may be available on GODADDY.COM's website.

A domain name may be registered to a registrant (perhaps by one of the above-described servers 210) by any domain name registration method known in the art or developed in the future, perhaps via a website-enabled domain name purchase and registration system. Alternatively, domain name registration may be accomplished via human to human communication, perhaps via a telephone call or in-person meeting. Domain names may be registered by, as non-limiting examples, any individual or entity including, but not limited to a domain name registry, domain name registrar, hosting provider, and/or software application developer or distributor.

The registrant (as well as users of this system generally) may comprise, as a non-limiting example, any individual or entity including, but not limited to, a person, a business, a governmental institution, an educational institution, a non-profit organization, or a social organization.

A hosted website may be associated with a domain name. In a non-limiting example embodiment, a domain name registrar which provides domain name services (as well as the administrator of the book's website hosted in the data center 240, or the data center 240, registrar's data center 250, or any other disclosed data center generally) may also provide hosting services for the hosted website including, but not limited to hosting one or more computers or servers in a data centers 240,250 as well as providing the general infrastructure necessary to offer hosting services to Internet users including hardware, software, Internet web sites, hosting servers, and electronic communication means necessary to connect multiple computers and/or servers to the Internet or any other network 200.

The illustrated embodiments place no limitation on the format the domain name may take. While future iterations of the DNS may establish alternate domain name formats (perhaps using different alphanumeric structures or file types such as image, audio, or video files functioning as a domain name or a similarly-functioning resource locator), which are explicitly contemplated by this patent application, the traditional domain name structure comprises a root name (i.e., "mycompany" in the domain name mycompany.com) concatenated to a top-level domain (i.e., ".com" in the domain name mycompany.com).

Likewise, the disclosed limitations place no limitations on the form the ISBN, title, author and/or subject-related domain names may take. For example ISBN-10: 2345678901 could be registered by any variation on that ISBN including ISBN-102345678901.com, ISBN-10-2345678901.net, 10_2345678901.info, etc. As another example, the Author's biographical information may be recommended to the author, using a .me domain name.

Figure 6:
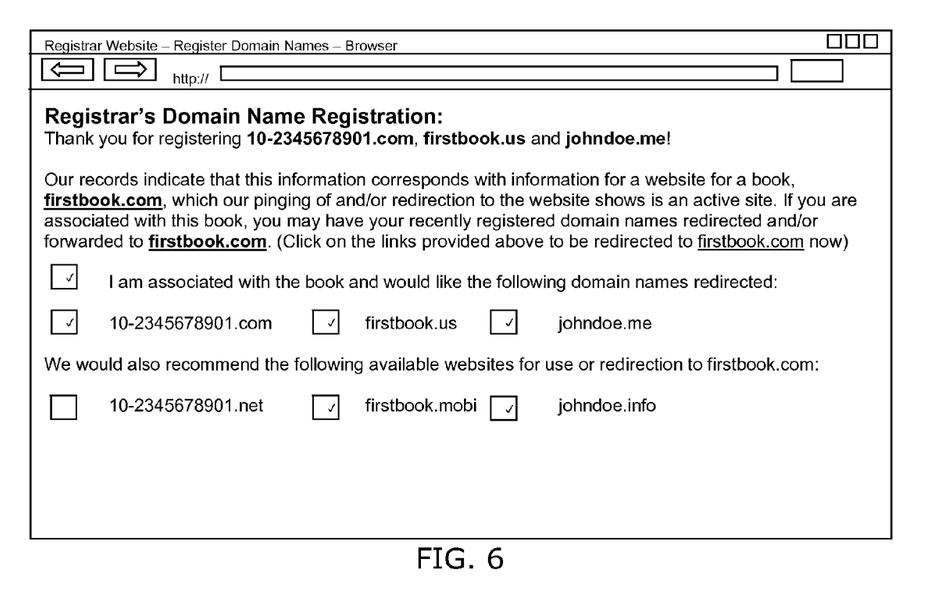
FIG. 6 illustrates a possible embodiment of an interface for registering a domain name related to the book and suggesting additional domain names based on the book information.

FIG. 6 shows an example interface using the disclosed structure that may be used for registering a domain name related to the ISBN, title, author and/or other book information using a registrar's server 210 in a registrar's data center 250 (Step 500). For example, a user may have registered one or more domain names, including 10-2345678901.com, firstbook.us and johndoe.me.

Using the synchronized and/or linked information from the data, software and/or hardware in the data center 240, the data, software and/or hardware in the registrar's data center 250 may determine that these registered domain names correspond with information for a website, firstbook.com, for the book "First Book." The user may be informed that these registered domain names correspond to the book and website, and allow the user to decide whether the recently registered domain names should be forwarded or redirected to First Book's website.

In the example embodiment in FIG. 6, the user may confirm that they are associated with the book as an author or publisher, for example. The user may then select, via checkboxes in this example, the domain names to be forwarded or redirected to firstbook.com. In this example, the user has selected all three registered domain names, 10-2345678901.com, firstbook.us and johndoe.me.

A redirect or forward command may then be implemented, possibly using a website redirection software module that allows these recently registered domain names to be forwarded to the book's domain name and website, in this case firstbook.com, thereby including ISBN, title and author-related domain names to be forwarded. No limitation should be placed on the types of top-level domain names (TLD) that can be forwarded, or suggested (described below). For example, any book information that includes a .net, .us, .me, etc. TLD may use a redirect command to forward the user to the webpage for the book (which may also be a website using a domain name with any of these TLD's).

In other embodiments (not shown), the user may use the interface to configure the data, software and hardware used to automatically forward or redirect any future related domain names to the book's website. For example, if the user were to select this option, the domain names firstbook.mobi and johndoe.info, seen in FIG. 6 would be automatically redirected to firstbook.com as soon as they were registered. In all embodiments, when a new domain name is registered, an email may be sent to the registrant to inform them that the domain name has been registered, that the domain name has been associated with the book and/or to inform them of any forwards or redirects associated with the new domain name.

The non-limiting embodiment illustrated in FIG. 6 shows an active website for the book, firstbook.com. Because the website is active, one or more links to the site may be provided, as shown (possibly by a redirect to the site or opening another popup window, according to techniques known in the art), and options may be given for recently registered and recommended domain names to redirect to this site.

Whether or not the site is active may be determined by an attempted redirect to or "pinging" of the site. Pinging the site is a computer network tool used to test whether a particular host is reachable across an IP network. Pinging may also be used to self test the network interface card of the computer, or as a latency test. Such redirection or pinging of a site and/or various domain names related to the site may allow the registrar to know when the book's website becomes active, thereby allowing the linking, redirecting and notice described in detail above.

If the redirection or pinging of the site (in this case firstbook.com) determines that the website is active, the author may confirm that they are associated with the book, open the site using provided links and/or select suggested related available domain names as described elsewhere in this specification.

However, if the redirection or pinging of the site determines that the site is not active, another embodiment may include the step of recommending a domain name related to the title (such as firstbook.com), if a domain name related to the title cannot be found. This may be become the primary or "anchor" domain name and website that all other registered domain names may be redirected to, and appropriate user input may be provided within the interface to allow the user to distinguish which will be the primary domain name or website.

In another embodiment, the registrant may be informed that the domain name has been registered, the domain name is associated with the book and/or to inform them of any forwards or redirects associated with the new domain name via an email (or any other notification method known in the art) as previously described or via an announcement on a social website. This may require a partnership between the host of the book's website, the domain name registrar and the one or more social websites involved.

A social networking data center (not shown) may likewise host the information needed for administration of a social networking website, including the general hosting infrastructure described above. The social networking data center may include any of the functionality found in the data center 240 or registrar's data center 250 disclosed elsewhere in this specification, including the ability to link or synchronize the data and functionality found in the other data centers 240, 250. Such social networking data centers may accept messages from text messages, SMS, web, mobile web, instant message, third party API projects or other third party applications, or possibly from the data, software or hardware in the data center 240 or registrar's data center 250.

FIG. 5 shows that the illustrated embodiment, as well as other disclosed embodiments, may include the step of suggesting or recommending a domain name related to the ISBN, title, author and/or other information relating to the book using a registrar's server in a registrar's data center based on the book's related information (Step 510).

FIG. 6 shows an example interface using the disclosed structure that may be used for suggesting or recommending a domain name related to the ISBN, title, author and/or other information relating to the book using a registrar's server in a registrar's data center based on the book's related information from a link to the data, hardware and software in the data center 240 (Step 510). For example, the user who registered 10-2345678901.com, firstbook.us and johndoe.me may not be aware of additional domain names available, but may want to be offered options to register these domain names.

The user may be informed that these registered domain names correspond to the book and website, and, using information, keywords, or any other domain name suggestion methods known in the art, and may be offered suggestions for and be allowed to select additional domain names that may be related to the book's ISBN, title, author, subject, keywords and or additional information relating to the book. In this example, the domain names 10-2345678901.net, firstbook.mobi and johndoe.info have been suggested to the user, who has selected firstbook.mobi and johndoe.info as additional possible domain names to be registered and possibly forwarded or redirected to the website firstbook.com. This forwarding or redirection may be automatic as disclosed above. In addition, if a suggested domain name is too long because the title of the book is too long for a reasonable domain name, additional domain names, such as a recommend ISBN number-related domain name and website may be suggested instead.

In another embodiment, the data center 240 which hosts and stores information regarding the book's website, as well as the registrar data center 250 may utilize the data storage 230, servers 210 and any related software modules to recognize the input of information that identifies a new book, an ISBN registered for a new book through the appropriate ISBN registration authority (possibly the International Organization for Standardization or ISO), or some other third party which may have access to this information, or any other information that may identify the new book.

This and other embodiments may include recommending a domain name and/or website related to the book to the users associated with the book when the book is assigned an ISBN. In order to accomplish this, a partnership may need to be established with the appropriate authority used to assign ISBNs, possibly the ISO, or some other third party which may have access to this information, and be able to give notice when an ISBN is assigned. This authority or third party may also have a data center (not shown) which may have any of the characteristics disclosed relating to the data center 240 or the registrar's data center 250.

When the ISBN is assigned to the book, a notice or any other required data may be sent from such a data center for the authority or third party to the data storage 230, or other hardware or software in the data center 240 or registrar's data center 250, and linked and/or synchronized as necessary. A domain name based on ISBN, title, author, subject or other information may then be recommended to the author, publisher or other users associated with the book, based on available domain names as described above.

This may be an automatic step, and/or may require a search of the data sources 230 in the registrar data center 250, or authority and/or third party's data center which in turn may require some type of partnership between the registrar and the authority or some other third party which may have access to this information.

In another embodiment, an especially popular book may be generating a lot of traffic or searches using one or more search engines, as are known in the art. These searches may be used to recognize a high amount of traffic or searches in a search engine for a certain book title, author information, subject information, etc. and trends related to these searches. Using the data, hardware and software modules in the data center 240 and registrar's data center 250, the information from these most popular searches may be collected (possibly from data in a data center for the search engine (not shown) with any of the characteristics disclosed relating to the data center 240 and registrar's data center 250) and used to determine that a domain name for the book information is available and to recommend domain names to the user using techniques disclosed elsewhere in this application.

Figure 7:
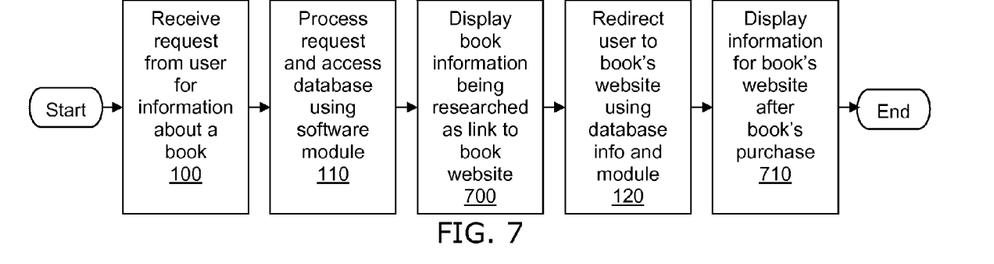
FIG. 7 is a flow diagram illustrating a possible embodiment including displaying book information being researched as a link to the book's website and displaying information for the book's website after the book's purchase.

FIG. 7 shows that the illustrated embodiment, as well as other disclosed embodiments, may include the step of partnering with a third party used to sell, provide, search or research books or book information, such as AMAZON.COM, BARNESANDNOBLE.COM, BORDERS.COM, ISBNDB.COM, SIRSIDYNIX, etc. Utilizing these partnerships, the website or software for these third parties may create and display an automatic link to the book's website where the ISBN or other book information is being researched and is listed on the third party website. (Step 700). In other words, the information for the book may be used to turn the ISBN, title, author, subject or other book information on the website into a link, allowing the user to augment their research of information relating to the book by accessing the book's website.

A data center for the third party (not shown) may likewise host the information needed for administration of the third party website or software. This data center may include the general data, server and hosting infrastructure described above. The third party data center may include any of the functionality found in the data center 240 or registrar's data center 250 disclosed elsewhere in this specification, including the ability to link and/or synchronize information between the data center 240, the registrar's data center 250, the third party's data center (not shown) or any other data center.

Figure 8:
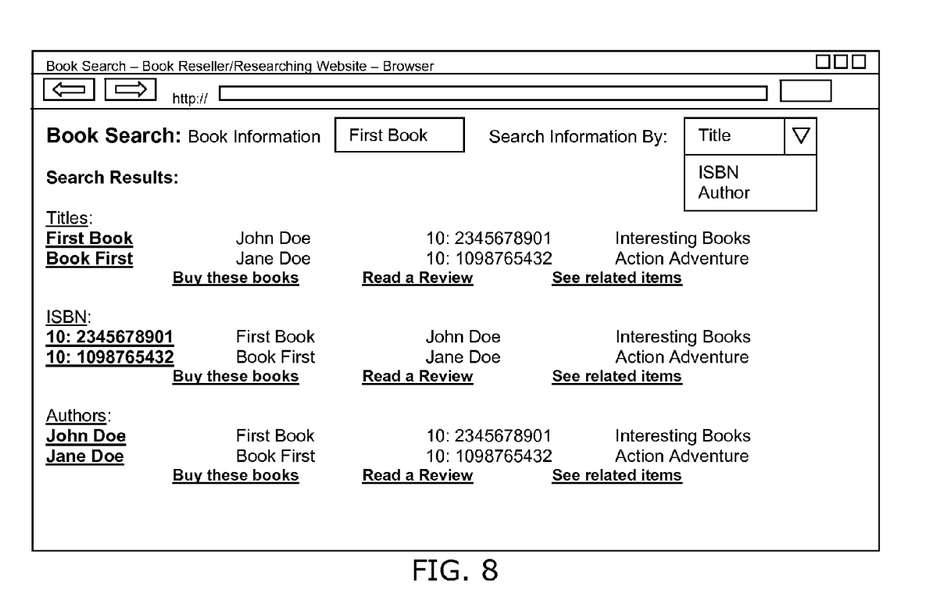
FIG. 8 illustrates a possible embodiment of an interface for displaying book information being researched as a link to the book's website.

FIG. 8 shows an example interface using the disclosed structure that may be used for partnering with a third party to create and display an automatic link to the book's website where the ISBN or other book information is being researched and is listed on the third party website. (Step 700). For example, in one embodiment, a user may go to a website such as AMAZON.COM, BORDERS.COM, BARNESANDNOBLE.COM or ISBNDB.COM to learn more about or to purchase a book, or may be using software from or distributed by a library research company such as SIRSIDYNIX to further research a book that is of interest to them.

A user may search a book ("First Book" in this example), using it's ISBN, title, author, subject, etc. and the search results may be displayed to the user, possibly sorted by title, ISBN, author, etc. Through the partnership established with the third party website or software company, the information from the data storage 230 in the data center 240 may be used to create a link within the search results allowing the user to be redirected from the third party website or software to the book's website.

In the embodiment shown in FIG. 8, the user, after searching for "First Book" may be provided with information divided into related titles, authors, ISBN, subject etc. Within these search results, the relevant subsection may include a link to relevant information on the book's website. In this case, a link is provided in the "Titles" portion which may forward or redirect the user to the relevant part of First Book's website dealing with the title. Likewise, the ISBN may be highlighted in the ISBN section, and a link created to allow the user to learn more about the book using the ISBN. Finally (but not by way of limitation), a link may be provided in the "Authors" section allowing the user to be redirected to the appropriate portion of the First Book's website to learn more about John Doe, the author.

These links may allow the user to be forwarded or redirected to the website, but in another embodiment, the link may include a popup window to the site, or may include a link from the retrieved information that would either redirect to the website, or open a popup window for the book's website. These links may be directed to the original site or any of the redirected domain names discussed in detail above.

No limitations should be placed on the type of third party websites that can be used in such a partnership. For example, the website may be for a reseller, such as AMAZON.COM, BARNESANDNOBLE.COM or BORDERS.COM, could be a database of book information such as ISBNDB.COM, or may be software used to search or research books in a library, such as SIRSIDYNIX where the user is searching the book, by any of the available criteria, such as title, author, subject ISBN, etc.

A link may also be included for additional multimedia information. For example, if a movie by the same name, based on the book, is available at that library, a link may also be included for that particular piece of multimedia. DVD's, audio books, etc. may also be included.

In another embodiment, the link displayed to the user may be in response to the user scanning a bar code associated with the ISBN or entering book information into an interface in a bookstore or library. For example, a user may scan the barcode for the book, either looking for more information about the book, or seeking a price check for the book at a "brick and mortar" type store such as Barnes and Noble or Borders. When the information displays after scanning this barcode, various actions could be taken to allow the user to access information on the book's website.

As non-limiting examples, a simple scanning machine may display a message such as "see www.firstbook.com for more information about the book" or "see www.10-2345678901.com for more information about the book." This information may also be included on the receipt, either electronic or in paper form, or in a follow up email when the book is purchased, thereby allowing the user to learn more about the book they have purchased.

Other embodiments may include a scanner connected to a computer terminal, in which case, either a link could be provided within the desired scanned information, or the website may be displayed upon scanning the book. In addition, the price check may also include information about the reseller, or be redirected to the reseller's page for information about the book, with the link for the book's website available from the reseller's page.

Finally, the information about the book may be emailed to the customer if they are a regular customer of the reseller (where their information would be stored in a database maintained by the reseller), or they may enter their information for email, fax, SMS etc. information after scanning the book to have information forwarded, emailed, texted, etc. to them.

Figure 1:
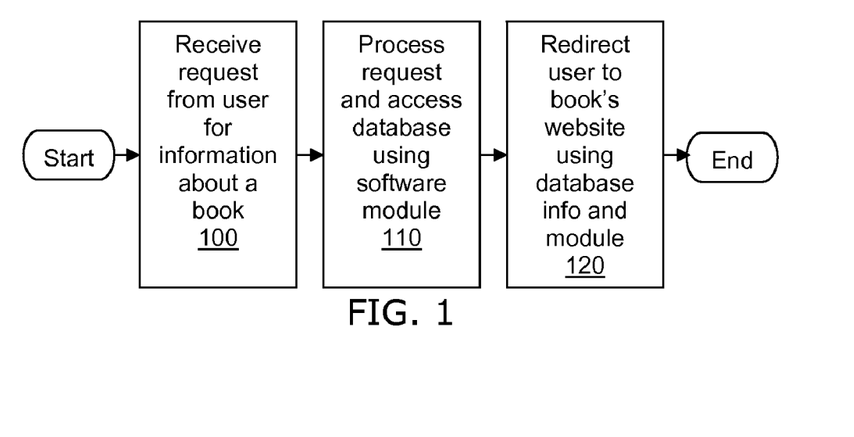
FIG. 1 is a flow diagram illustrating a possible embodiment of a method for redirecting a user to a book's website.

The additional steps included in the embodiments illustrated in FIGS. 1-8 are not limited to the embodiment shown in FIG. 1 and may be combined in several different orders and modified within multiple other embodiments.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system, comprising:
   A) a data storage communicatively coupled to a network and comprising a title, an author, an ISBN, a URL to a website or any combination thereof for each of one or more books;
   B) one or more server computers communicatively coupled to said network and configured to:
      i) register one or more domain names, said one or more domain names comprising said title, said author, said ISBN or any combination thereof for a book;
      ii) search said data storage for said title, said author, said ISBN, said URL and said website for said book;
   C) a client computer communicatively coupled to said network and configured to:
      i) responsive to a determination that said title, said author, said ISBN, said URL or said website is found in said data storage:
         a) ping said website for said book to determine if said website is active;
         b) display a message received from said one or more server computers requesting confirmation that said title, said author said ISBN, said URL or said website correspond to said book; and
         c) display said one or more domain names, configured to be selected for redirection using said URL, to said website for said book; and
      ii) responsive to a determination that said title, said author, said ISBN, said URL and said website are not found in said data storage, display one or more recommended domain names configured to be selected in association with said website for said book.

2. The system of claim 1, wherein said one or more recommended domain names are redirected to said website for said book.

3. The system of claim 1, wherein, responsive to a determination that said website is active, transmitting, by said one or more server computers for display on said client computer, a link to said website.

4. The system of claim 3, wherein said link is configured to cause said client computer to display a popup window displaying said website for said book.

5. The system of claim 1, wherein, responsive to a determination that said website is not active, transmitting, by said one or more server computer for display on said client computer, said one or more recommended domain names.

6. The system of claim 1, wherein said website for said book is created from a domain name selected from said one or more recommended domain names.

7. The system of claim 1, wherein said message comprises confirmation that a user of said client computer is an author or a publisher of said book.

8. The system of claim 1, wherein said one or more domain names and said one or more recommended domain names are configured to be displayed on said client computer and selected using one or more graphical user interface controls.

9. The system of claim 8, wherein said one or more graphical user interface controls comprise checkboxes.

10. The system of claim 1, wherein said one or more recommended domain names comprise said title, said author, said ISBN or any combination thereof for said book.

11. The system of claim 1, wherein said recommended domain names are suggested based on said title, said author, said ISBN or any combination thereof.

12. The system of claim 1, wherein said one or more domain names are automatically redirected to said website for said book.

13. The system of claim 11 wherein said at least one website is managed by a third party which is a distributor of library research software.

14. The system of claim 1, wherein said ISBN number is recommended as one of said one or more recommended domain name as an alternative to said title.

15. The system of claim 1, wherein, responsive to receiving a notification from a third party of a new book, said one or more recommended domain names are transmitted to said client computer for display.

16. The system of claim 1, wherein, responsive to receiving a notification from a search engine software of said book as a popular search, said one or more recommended domain names are transmitted to said client computer for display.

* * * * *